United States
Doi et al.

[15] 3,706,484

[45] Dec. 19, 1972

[54] OPTICAL SYSTEM FOR MECHANICALLY SCANNING WITH A ROTATING POLYHEDRAL REFLECTOR

[72] Inventors: Yoshikazu Doi; Toshiro Kishikawa; Yasumasa Sunaga, all of Ohmiya-shi, Saitama-ken, Japan

[73] Assignee: Fuji Shashin Koki Kabushiki Kaisha, Ohmiya-shi, Japan

[22] Filed: April 23, 1970

[21] Appl. No.: 31,323

[52] U.S. Cl.....................................350/7, 350/285
[51] Int. Cl..............................................G02b 27/08
[58] Field of Search..........250/203; 350/6, 7, 12, 13, 350/199, 200, 285, 299

[56] References Cited

UNITED STATES PATENTS

| | | | |
|---|---|---|---|
| 3,434,073 | 3/1969 | Forkner | 350/285 |
| 3,211,046 | 10/1965 | Kennedy | 350/7 |
| 2,719,457 | 10/1955 | Tripp | 350/7 |
| 3,326,619 | 6/1967 | Johnson et al. | 250/203 |
| 3,029,685 | 4/1962 | Korneff et al. | 350/7 |
| 3,531,785 | 9/1970 | Corcoran | 350/7 |

FOREIGN PATENTS OR APPLICATIONS

| | | | |
|---|---|---|---|
| 1,036,013 | 7/1964 | Great Britain | 350/7 |

*Primary Examiner*—David Schonberg
*Assistant Examiner*—Michael J. Tokar
*Attorney*—Waters, Roditi, Schwartz & Nissen

[57] ABSTRACT

A method for mechanically scanning an image of a lens system by rotating a reflecting polyhedral element. A ray bundle from an object is converted into parallel light at a portion of the optical system and the polyhedral element is disposed in the path of the parallel light to reflect the parallel light thereon. The reflected light is focused by an image-forming lens. In this way, the flatness of the formed image can be improved and the size of the polyhedral element can substantially be reduced.

2 Claims, 8 Drawing Figures

PATENTED DEC 19 1972 3,706,484

OPTICAL SYSTEM FOR MECHANICALLY SCANNING WITH A ROTATING POLYHEDRAL REFLECTOR

The present invention relates to a system for mechanically scanning an image formed by a lens, to be received by a detector.

It is well known to scan an object over a certain range by providing a suitable size of aperture at the center of a plane in which an image of the object is to be formed by a lens, and a detector; arranging a plane mirror and/or a polyhedral reflector between the image forming plane and the lens; and causing the plane mirror to make a reciprocal angular motion or the polyhedral reflector to rotate. According to the conventional method, however, a problem arises in respect of flatness of the image and the rotary polyhedral element becomes undesirably large, when the image is to be scanned over a relatively wide range.

An object of the present invention is to provide a system for detecting a focused image by a detector, which system is entirely free of the flatness problem even when the image is scanned over a relatively wide range.

Another object of the invention is to provide a system of the character described, in which the rotary element can be reduced in size and which, therefore, can be made compact as a whole.

Still another object of the invention is to make it possible to increase the rotational speed of the rotary polyhedron and to increase the scanning line or the number of frames per second.

In order to assist in understanding the present invention, a detailed description of the invention will be given hereunder with reference to the accompanying drawings, in which.

Figure 1:
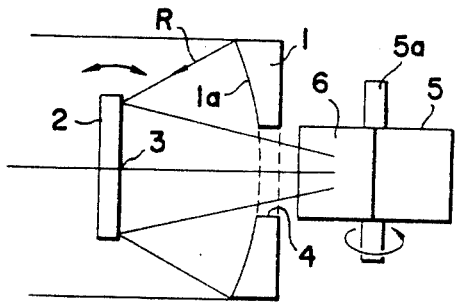
FIG. 1 is a side view schematically showing a conventional system.
Figure 2:
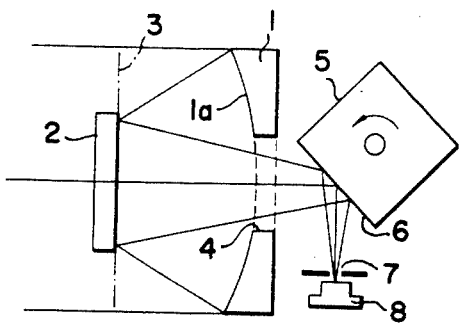
FIG. 2 is a plan view of the system of FIG. 1.

Referring first to FIGS. 1 and 2, there is shown a prior art system as applied to a reflecting optical system. The same principle may similarly be applied to a refracting optical system. The optical system shown in FIGS. 1 and 2 includes a concave reflector 1a and a first mirror 1 having an aperture 4 therein. The ray bundle R focused by the first mirror 1 is reflected on a flat second mirror 2 and passes through the aperture 4 in the first mirror 1. A polyhedral element 5 having a plurality of flat reflecting surfaces 6 therearound is arranged in the path of the light passing through the aperture 4 and the light suitable size of aperture 7, which is received by a detector 8. The second mirror 2 is caused to make a reciprocal angular motion about a horizontal axis 3 passing perpendicularly through the intersection of the optical axis with the reflecting surface thereof and being at right angles to said optical axle, whereas the polyhedral element 5 is caused to rotate about a vertical axis 5a in the direction of the arrow. Thus, it will be understood that the ray bundle from an object is scanned in both the vertical and horizontal directions.

Figure 3:
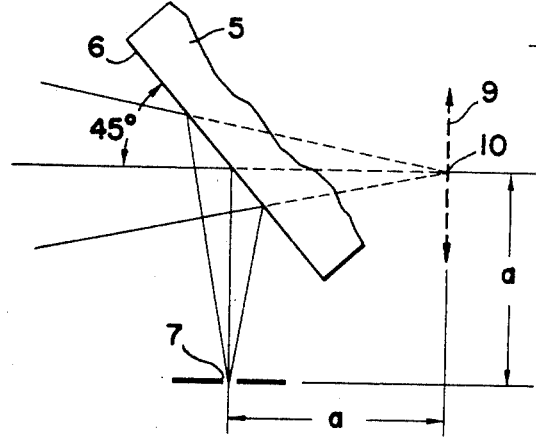
FIGS. 3 and 4 are fragmentary enlarged plan views respectively, for the purpose of explaining the operation of the system shown in FIGS. 1 and 2.
Figure 4:
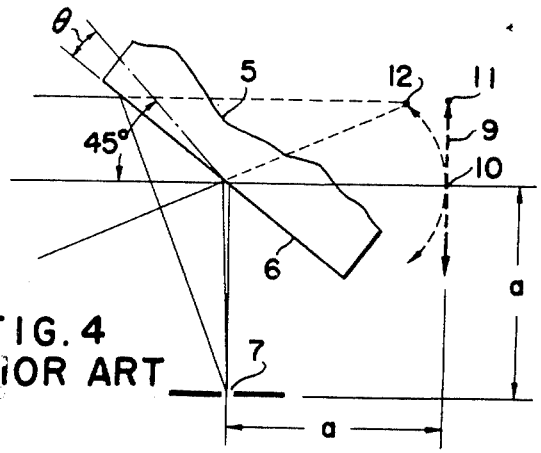

In such optical system, if the optical distance from the aperture 4 in the first mirror 1 and the aperture 7 which is the image forming point is too large, the second mirror 2 will have to be large or the interval between the first mirror 1 and the second mirror 2 will have to be small, when the system is bright, with the result that the central hollow of the doughnut-shaped ray, i.e., the aperture 4, will have to be relatively large. Consequently, it becomes necessary to arrange the aperture 4 of the first mirror 1 and the aperture 7 at a relatively short distance from each other and, therefore, to arrange the reflecting surface 6 of the rotary element 5 and the aperture 7 at a still shorter distance from each other. When the distance between the reflecting surface 6 of the rotary element 5 and the aperture 7 is reduced as described, the following disadvantages will occur:

Namely, in FIG. 3, concerning the central image 10 of the optical image 9 of an object, having a necessary field of vision, before it is reflected on the reflecting surface 6 of the rotary element 5, the reflected image thereof coincides with the aperture 7 when the reflecting surface 6 is inclined at an angle of 45° to the optical axis. In order to reflect the corner image 11 of the optical image 9 along the horizontal edge portion thereof to be focused at the aperture 7 as shown in FIG. 4, the reflecting surface 6 must be turned through an angle $\theta$. This angle of rotation $\theta$ obviously becomes larger as the field of vision becomes larger, namely as the distance between the central image 10 and the corner image 11 becomes larger, and also as the distance $a$ between the point of reflection on the reflecting surface 6 and the aperture 7 becomes smaller. However, when the reflecting surface 6 is turned through an angle $\theta$, the conjugate point of the aperture 7 lies, not at the location of the corner image 11 but at a point 12 as shown in FIG. 4, and this point 12 in a system of coordinates having its origin at the point of the central image 10 is represented by the following coordinates $(x, y)$:

$x = -2a \sin^2 \theta$ $y = 2a \sin \theta \cos \theta$

This means that the image focused at the aperture 7 is given by the point 12 or conversely the corner image 11 is not focused at the aperture 7 to form a sharp image but the image formed becomes blurred. When the angle of rotation $\theta$ is large as stated above, the value $x$ becomes considerably large and exceeds the practical limit.

In addition to the problem set forth above, in order to reflect the ray bundle of the corner image 11 with no loss, the area of the reflecting surface 6 must be large enough to cover the size of the entire optical image 9, as will be clearly understood from FIG. 4.

Such problem of image flatness may be solved by rotating or reciprocating the reflecting surface, not at a location where the light is being converged but at a location where the light is passing in parallel relation. Namely, at a location where the light is parallel, no image exists and the size of an object exterior of the optical axis is determined solely by the angle of inclination of the ray bundle emitted from the outside of the optical axis to the optical axis.

Figure 5:
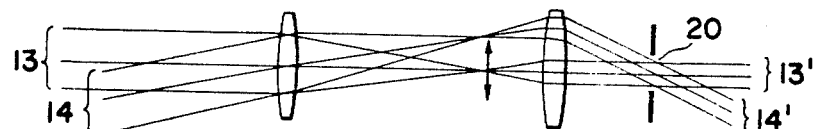
FIG. 5 is a schematical view illustrating the principle of an afocal optical system employed in the system of this invention.

In FIG. 5, there is exemplified an afocal optical system in which the ray bundle is projected as parallel light.

Referring to FIG. 5, the ray bundle 13 emitted from a point on the optical axis of an object at a remote distance passes the afocal optical system and is projected as parallel light 13', and the ray bundle 14 emitted from points outside the optical axis is projected as parallel light 14'. Therefore, when the aforesaid rotary polyhedron is arranged either forwardly or rearwardly of the afocal optical system, scanning of an object which has a size is determined only by a change in angular position of the reflecting surface and hence the image flatness can be improved. It should be noted, however, that to locate the reflecting surface forwardly of the lens system is generally disadvantageous in that the reflecting surface is required to be extremely large in area, which not only makes high speed scanning difficult but also adversely affect the parallelism of the ray bundle where the object is relatively close to the system.

Thus, according to preferred embodiments of the present invention an afocal lens system is utilized and a rotary polyhedron is located on the projecting side of said system to effect scanning.

Figure 6:
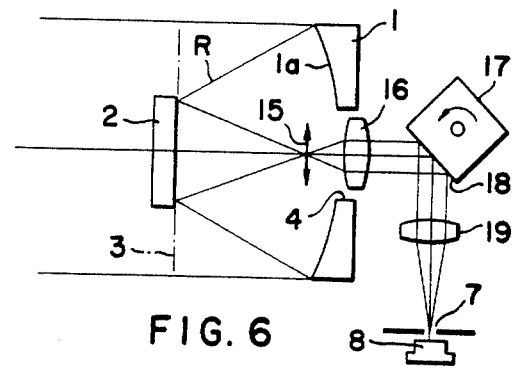
FIG. 6 is a schematic plan view showing an embodiment of the present invention.

FIG. 6 shows an embodiment of the invention. The optical system shown in FIG. 6, similar to that of FIGS. 1 and 2, includes a first mirror 1 having a concaved reflecting surface 1a and an aperture 4. The ray bundle R reflected on the reflecting surface 1a of the first mirror 1 is reflected on a second mirror 2 having a flat reflecting surface and forms an image at the focal point as indicated by numeral 15. The ray bundle from the image 15 passes the aperture 4 in the first mirror 1 and is arranged into parallel light by a lens 16 disposed adjacent the aperture 4. A rotary polyhedral element 17 having a plurality of reflecting surfaces 18 is disposed in the path of the parallel light passing through the lens 16. The parallel light is reflected on one of the reflecting surfaces 18 and passes through an image-forming lens 19 to form an image at an aperture 7, which is received by a detector 8.

In general, when a convex lens is used for the lens on the projecting side of an afocal optical system, an exit pupil is provided at the rear of said lens and the entire ray bundle is passed through said exit pupil. The diameter of the exit pupil can be reduced by making large the focal distance ratio between the objective lens and the lens on the projecting side of the system. Reference numeral 20 in FIG. 5 designates this exit pupil. In the arrangement of FIG. 6, the reflecting surface 18 of a rotary polyhedral element 17 is located at the position of the exit pupil of an afocal system composed of a first mirror 1, a second mirror 2 and a lens 16, and further the focal distance ratio between the first mirror 1 and the lens 16 is made large, whereby the rotary polyhedral element 17 can be considerably reduced in size.

The afocal system further has the following advantageous feature: Namely, even when the ray bundle is divided into two or more smaller bundles at the exit pupil, all of these smaller bundles can be focused to one point to form an image by injecting them into one lens concurrently at the same angle of incidence. By making use of this feature, it is possible to employ a method wherein the ray bundle is divided into two or more smaller bundles by using two or more reflecting surfaces concurrently, instead of using only one reflecting surface, of the rotary polyhedral element and said smaller bundles are gathered again. The concurrent use of two or more reflecting surfaces for a fixed size of ray bundle naturally enables the necessary area of one reflecting surface to be reduced and hence enables the rotary polyhedral element to be considerably reduced in size. This obviously facilitates the designing of the entire optical system spacewise, but in addition, makes it possible to rotate the rotary polyhedral element by a motor of small output at such a high speed as has not been attainable in the case of a large rotary element, and thereby to increase the scanning speed. Consequently, there can be achieved such definite advantage that the number of scanning lines can be increased or the number of frames per second can be increased.

Figure 7:
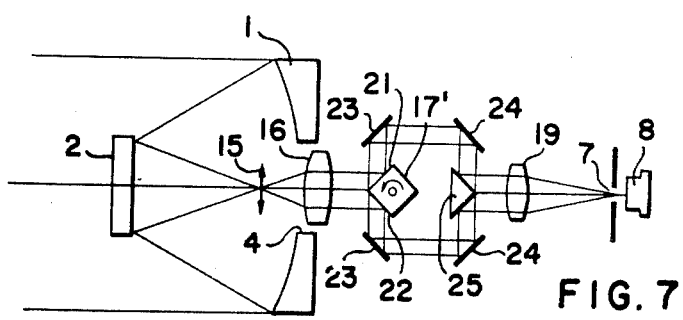
FIG. 7 is a schematic plan view showing another embodiment of the invention.

An embodiment having such advantageous feature as described above is shown in FIG. 7. In FIG. 7, the parallel light passing through the lens 16 is divided into two reflected rays by the reflecting surfaces 21 and 22 of a small rotary polyhedral element 17'. The rays thus divided are reflected on fixed mirrors 23, 24, and 25 respectively and again gathered into a single ray, which forms an image at the aperture 7 through the image-forming lens 19.

Figure 8:
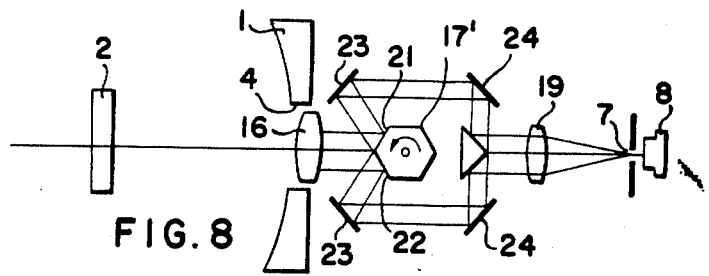
FIG. 8 is a schematic plan view showing still another embodiment of the invention.

Although in the embodiments shown in FIGS. 6 and 7 the rotary polyhedral elements are tetrahedral, it is to be understood that the above-described feature can be offered to the systems by the use any polyhedral element, e.g., a hexahedron as shown in FIG. 8.

From the foregoing description, it will be clear that in a method of mechanically scanning an optical image, the flatness of the image can be improved and the rotary polyhedral element can be reduced in size to some extent, by the use of an afocal optical system. It will also be understood that by dividing a ray bundle by simultaneously using two or more reflecting surfaces of a rotary polyhedral element, it is possible to substantially reduce the size of said polyhedral element and thereby to increase the number of revolution of the polyhedral element.

We claim:

1. An optical system comprising a first mirror provided with an aperture in the center thereof and having a concave reflecting surface, said mirror being a body and said aperture being an opening passing through said body, a second mirror having a flat reflecting surface for reflecting a ray bundle reflected on said first mirror toward said aperture, a first lens disposed at said aperture to convert the reflected ray bundle from said second mirror into parallel light, said first and second mirrors cooperating to form an image at a focal point between said second mirror and said first lens, said first lens having a focal point at the first said focal point and producing a ray bundle of parallel light, a polyhedral element disposed in the path of said parallel light for rotation about an axis of rotation thereof and having a plurality of reflecting surfaces, and a second lens for focusing rays reflected from the reflecting surfaces of said polyhedral element to form an image, said second mirror being adapted for reciprocal angular motion about an axis of rotation perpendicular to the axis of rotation of said polyhedral element, means for causing the reciprocal angular motion of said second mirror, and means for causing rotational motion of said polyhedral element, said mirrors and lens being so dimensioned and arranged that the parallel light has a substantially smaller cross-section than said ray bundle.

2. An optical system as defined in claim 1, wherein said polyhedral element is positioned in such a manner as to divide the parallel light from said first lens means into two rays upon reflecting it, comprising further means for gathering the divided rays into a single light and leading said single light to said second lens means.

* * * * *